(12) United States Patent
Sixel et al.

(10) Patent No.: US 9,719,447 B2
(45) Date of Patent: Aug. 1, 2017

(54) METHOD FOR CONTROLLING AN INTERNAL COMBUSTION ENGINE

(71) Applicant: Caterpillar Motoren GmbH & Co. KG, Kiel (DE)

(72) Inventors: Eike Joachim Sixel, Kiel (DE); Daniel Wester, Felde (DE); Arvind Sivasubramanian, Peoria, IL (US); Adam Stubbs, Peterborough (GB)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 94 days.

(21) Appl. No.: 14/795,910

(22) Filed: Jul. 10, 2015

(65) Prior Publication Data
US 2016/0010581 A1   Jan. 14, 2016

(30) Foreign Application Priority Data

Jul. 11, 2014   (EP) .................................. 14176648

(51) Int. Cl.
*F02D 41/14*   (2006.01)
*F02D 35/02*   (2006.01)
(Continued)

(52) U.S. Cl.
CPC .......... *F02D 41/1487* (2013.01); *F02B 37/16* (2013.01); *F02B 37/183* (2013.01); *F02D 19/0642* (2013.01); *F02D 33/006* (2013.01); *F02D 35/027* (2013.01); *F02D 41/0007* (2013.01); *F02D 41/0027* (2013.01);
(Continued)

(58) Field of Classification Search
CPC .... F02B 37/16; F02B 37/183; F02D 19/0642; F02D 33/006; F02D 35/027; F02D 41/0007; F02D 41/0027; F02D 41/0052; F02D 41/0077; F02D 41/1487; F02D 41/3005; F02P 5/1527; F02P 9/002; Y02T 10/46

See application file for complete search history.

(56) References Cited

U.S. PATENT DOCUMENTS

| 7,178,503 B1 | 2/2007 | Brehob |
| 2004/0139943 A1* | 7/2004 | Kern ....................... F01P 11/16 123/198 D |

(Continued)

FOREIGN PATENT DOCUMENTS

DE   10 2006 056574   5/2007

OTHER PUBLICATIONS

European Search Report dated Jan. 13, 2015, in EP Application 14176648.5 (2 pages).

*Primary Examiner* — Audrey K Bradley (57) ABSTRACT

A method for controlling an internal combustion engine is disclosed. The method may include receiving knock data corresponding to knock levels over a time period. The method may also include determining from the knock data whether the knock levels change over the time period. Further, the method may include determining that a variation in the gas composition of the gaseous fuel supplied to the internal combustion engine has occurred when the knock levels change over the time period. In addition, the method may include adjusting an operating condition of the internal combustion engine to adapt a knock susceptibility of the internal combustion engine to the varying gas composition.

20 Claims, 7 Drawing Sheets

(51) Int. Cl.
    *F02D 19/06*     (2006.01)
    *F02D 19/08*     (2006.01)
    *F02P 5/152*     (2006.01)
    *F02D 41/00*     (2006.01)
    *F02B 37/16*     (2006.01)
    *F02B 37/18*     (2006.01)
    *F02D 33/00*     (2006.01)
    *F02D 41/30*     (2006.01)
    *F02P 9/00*     (2006.01)

(52) U.S. Cl.
    CPC ..... *F02D 41/0052* (2013.01); *F02D 41/0077* (2013.01); *F02D 41/3005* (2013.01); *F02P 5/1527* (2013.01); *F02P 9/002* (2013.01); *Y02T 10/46* (2013.01)

(56) References Cited

U.S. PATENT DOCUMENTS

| | | | |
|---|---|---|---|
| 2007/0157912 A1* | 7/2007 | Ritter | F02B 29/0418 123/679 |
| 2009/0031987 A1 | 2/2009 | Tanaka | |
| 2013/0255628 A1* | 10/2013 | Moren | F02B 69/04 123/406.29 |
| 2015/0219027 A1* | 8/2015 | zur Loye | F02D 41/0027 60/603 |

\* cited by examiner

METHOD FOR CONTROLLING AN INTERNAL COMBUSTION ENGINE

CLAIM FOR PRIORITY

This application claims benefit of priority of European Patent Application No. 14176648.5, filed Jul. 11, 2014, which is incorporated herein by reference.

TECHNICAL FIELD

The present disclosure generally relates to internal combustion engines. More particularly, the present disclosure relates to a method for controlling an internal combustion engine supplied with gaseous fuel of a varying gas composition.

BACKGROUND

Gaseous fuel operated internal combustion engines typically use natural gas or bio-gas as an energy source for combustion. Those gaseous fuels commonly comprise a blend of different hydrocarbons such as methane and higher hydrocarbons as well as inert gases. The composition of gaseous fuel may vary during the operation of the internal combustion engine, for example, when gaseous fuel from a gas field or other gas reservoirs is used. The variation of the gas composition may occur over a long time period, for instance over minutes or hours and may be caused by changes in the gas quality present in those gas reservoirs.

Variations of the gas composition may also affect the energy content of the gaseous fuel, for example, by varying amounts of higher hydrocarbons. As a result, the internal combustion engine is operated with gaseous fuel of a varying energy content. Thus, variations of the gas composition may have an impact on the operation of the internal combustion engine.

The present disclosure is directed, at least in part, to improving or overcoming one or more aspects of prior systems.

SUMMARY OF THE DISCLOSURE

According to one aspect of the present disclosure, a method for controlling an internal combustion engine operating at least partly on gaseous fuel with a varying gas composition is disclosed. The method comprises receiving a knock data corresponding to knock levels over a time period of a varying gas composition, determining from the knock data that the knock levels have a tendency to change over the time period and accordingly that a variation in the gas composition of the gaseous fuel supplied to the internal combustion engine has occurred. The method further comprises adjusting an operating condition of the internal combustion engine (such as one or more operation parameters) to adapt a knock susceptibility of the internal combustion engine to the varying gas composition.

According to another aspect of the present disclosure, a control system for an internal combustion engine operating at least partly on gaseous fuel with a varying gas composition is disclosed. The control system comprises a knock sensor configured to continuously detect knock levels of the internal combustion engine or of each individual cylinder of the internal combustion engine, and a control unit connected to the knock sensor and configured to perform the method as exemplary disclosed herein.

According to yet another aspect of the present disclosure, an internal combustion engine operating at least partly on gaseous fuel with a varying gas composition comprises the control system as exemplary disclosed herein.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that a change in gas composition can be associated with a changing lower heating value (LHV) and/or Methane Number of a gaseous fuel supplied to an internal combustion engine. The LHV commonly represents the energy content of a gaseous fuel and is a measure of the heat release of combustion. The Methane Number indicates a knock susceptibility of the gaseous fuel and is typically in the range from 0 to 140, where higher Methane Numbers indicate a lower knock susceptibility of the fuel.

It was further realized that a changing LHV and/or Methane Number may cause a change of knock levels of the internal combustion engine. In particular, it was found that in case of rising LHVs and/or decreasing Methane Numbers, the knock levels of the internal combustion engine may have a tendency to increase. Likewise, decreasing LHVs and/or increasing Methane Numbers may correspond to a tendency of decreasing knock levels. Those tendencies of increasing or decreasing knock levels may typically occur over, for example, a time period of several 10 seconds to 120 min. That time period is longer than a time period usually associated with engine knock caused by other phenomena than the described varying gas composition, which would require instant countermeasures.

The present disclosure is further based in part on the realization that—once it has been determined that the knock levels have a tendency to increase or decrease and accordingly that a change in the LHV and/or Methane Number of the gaseous fuel has occurred—an operating condition of the internal combustion engine is adjusted to adapt a knock susceptibility of the internal combustion engine to the varying gas composition. The operating condition may be adjusted, for example, by increasing an intake manifold air pressure (IMAP) of intake air, delaying an ignition timing of a cylinder of the internal combustion engine, and/or substituting a portion of gaseous fuel with liquid fuel, in case the knock levels have a tendency to increase. Likewise, if the knock levels have a tendency to decrease, the operating condition may be adjusted, for example, by decreasing an IMAP of intake air, advancing an ignition timing of a cylinder, and/or substituting a portion of liquid fuel with gaseous fuel.

In the following, an internal combustion engine operable at least partly on gaseous fuel and exemplary methods for controlling the same are described in connection with FIG. 1 to FIG. 3 and FIG. 4 to FIG. 7, respectively.

Figure 1:
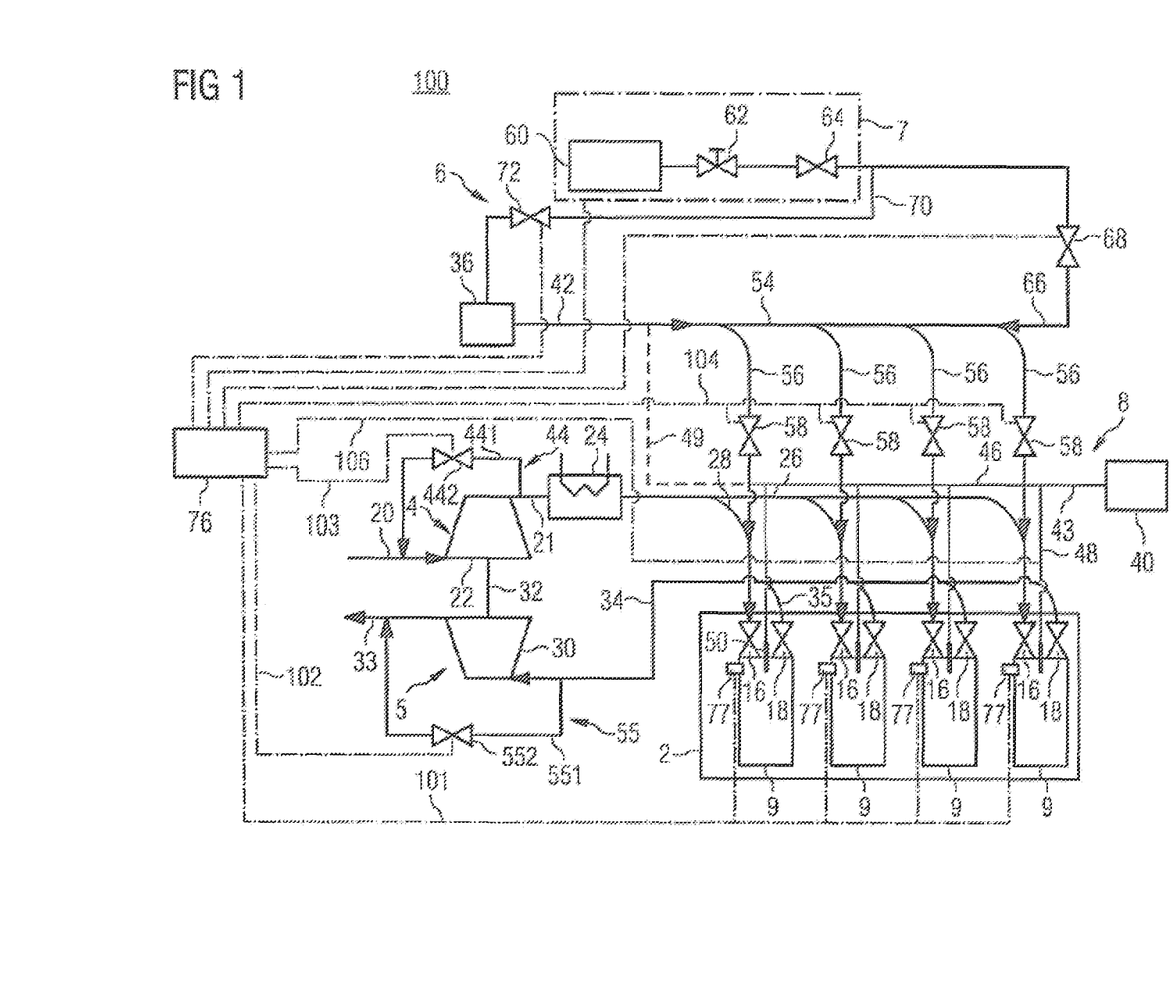
FIG. 1 shows a schematic drawing of an exemplary internal combustion engine operable at least partly on gaseous fuel.
Figure 2:
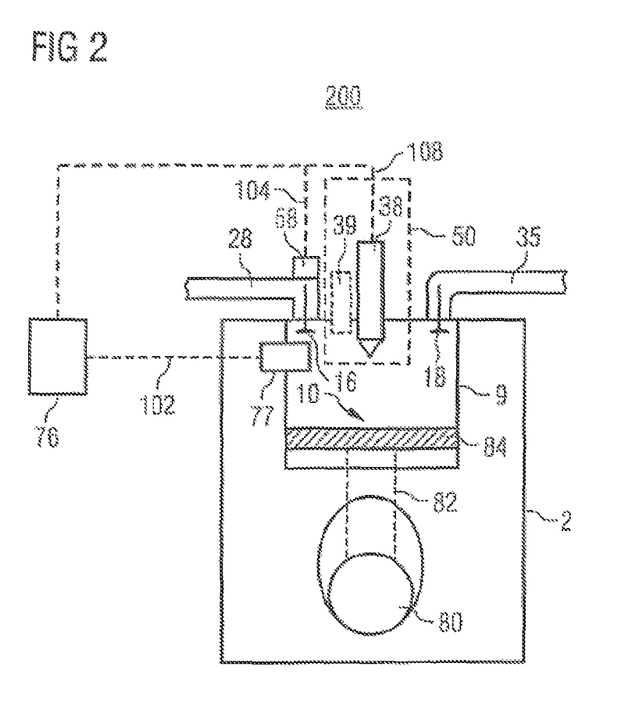
FIG. 2 shows a schematic cross-sectional view of a cylinder of a dual fuel (DF) internal combustion engine.
Figure 3:
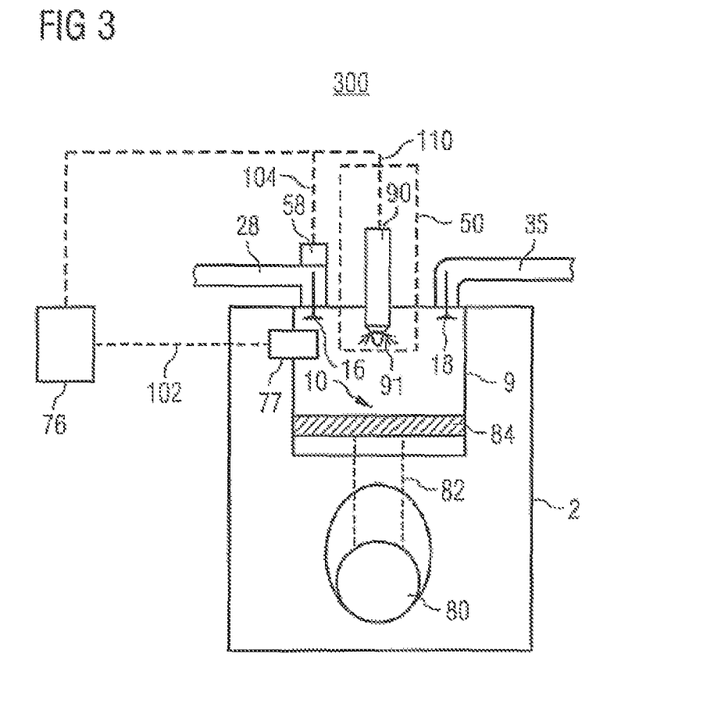
FIG. 3 shows a schematic cross-sectional view of a cylinder of a gaseous fuel internal combustion.

FIG. 1 shows schematically an exemplary internal combustion engine 100 operating at least partly on gaseous fuel, such as a DF engine (illustrated schematically in FIG. 2) or a gaseous fuel engine (illustrated schematically in FIG. 3).

Internal combustion engine 100 comprises an engine block 2, a charge air system 4, an exhaust gas system 5, a gaseous fuel system 6 including a purge gas system 7 and/or a liquid fuel system 8. Internal combustion engine 100 can be powered with a liquid fuel such as, for example, diesel fuel in a liquid fuel mode (LFM), and with a gaseous fuel such as natural gas provided, for example, by an LNG-system, in a gaseous fuel mode (GFM).

Engine block 2 comprises a plurality of cylinders. Exemplarily, four cylinders 9 are depicted in FIG. 1. Engine block 2 may be of any size, with any number of cylinders, such as 6, 8, 12, 16 or 20, and in any configuration, for example, "V", in-line or radial configuration.

Each cylinder 9 is equipped with at least one inlet valve 16 and at least one outlet valve 18. Inlet valves 16 are fluidly connected to charge air system 4 and configured to provide charge air, or a mixture of charge air and gaseous fuel into cylinders 9. Analogous, outlet valves 18 are fluidly connected to exhaust gas system 5 and configured to direct exhaust gas out of respective cylinder 9.

Charge air is provided by charge air system 4 including an air intake 20, a compressor 22 to charge air, a compressor outlet 21 and a charge air cooler 24. A intake manifold 26 is fluidly connected downstream of charge air cooler 24 and guides charge air via cylinder specific inlet channels 28 into respective cylinders 9.

Charge air system 4 may further comprise a blow-off system 44. Blow-off system 44 includes, for example, a blow-off line 441 and at least one blow-off valve 442 disposed within blow-off line 441. Blow-off line 441 may be fluidly connected to compressor outlet 21 upstream or downstream of charge air cooler 24 and to air intake 20 upstream of compressor 22. Alternatively, blow-off line 441 may not be connected to air intake 20 but may be open to the environment. Blow-off valve 442 may be configured to allow a portion of charge air to return to air intake 20, thereby bypassing compressor 22 via blow-off line 441, in case for example a pressure in compressor outlet 21 exceeds a preset threshold level. Blow-off valve 442 may also help to control a desired fuel-to-air ratio of a fuel-air mixture admitted to cylinder 9. When blow-off line 441 is not connected to air intake 20, the portion of charge air bypassing compressor 22 may be released to the environment.

Exhaust gas system 5 includes an exhaust gas turbine 30 connected to compressor 22 via shaft 32 and an exhaust gas manifold 34 guiding exhaust gas from individual exhaust gas outlet channels 35 to exhaust gas turbine 30 and further to exhaust gas outlet 33.

Exhaust gas system 5 may further comprise a wastegate system 55. Wastegate system 55 includes, for example, a wastegate line 551 and at least one wastegate valve 552 disposed within wastegate line 551. Wastegate line 551 may be fluidly connected to exhaust gas manifold 34 upstream of exhaust gas turbine 30 and to exhaust gas outlet 33 downstream of exhaust gas turbine 30. The skilled person may appreciate that wastegate line 551 and wastegate valve 552 may be provided in different configurations than the one shown here. Wastegate valve 552 may be configured to allow a portion of exhaust gas bypassing exhaust gas turbine 30 via wastegate line 551, if, for example, a compression of intake air shall not exceed a preset compression rate.

Charge air system 4 may further comprise one or more intake manifolds 26. Similarly, exhaust gas system 5 may comprise one or more exhaust gas manifolds 34.

In addition, inlet valves 16 and outlet valves 18 may be installed within inlet channels 28 and outlet channels 35, respectively. Inlet channels 28 as well as outlet channels 35 may be provided within a common cylinder head or individual cylinder heads covering cylinders 9.

Gaseous fuel system 6 comprises a gaseous fuel source 36 connected to gaseous fuel piping 42. Gaseous fuel source 36 constitutes a gaseous fuel feed for supplying gaseous fuel for combustion in GFM. For example, gaseous fuel source 36 comprises a gas valve unit and a gaseous fuel tank that contains, for example, natural gas in a pressurized state.

Gas valve unit is configured to allow, to block, and to control flow from gaseous fuel tank into gaseous fuel piping 42. The gas valve unit may comprise gaseous fuel control valves, gaseous fuel shut-off valves and venting valves.

Gaseous fuel piping 42 is fluidly connected to a gaseous fuel manifold 54, which splits into a plurality of gaseous fuel channels 56. Each gaseous fuel channel 56 is fluidly connected to one of the plurality of inlet channels 28. To dose gaseous fuel into individual inlet channels 28, in each gaseous fuel channel 56, a gaseous fuel admission valve 58 is installed. In some embodiments, internal combustion engine 100 may comprise more than one gaseous fuel manifold 54.

Each gaseous fuel admission valve 58 is configured to allow or to block flow of gaseous fuel into an individual inlet channel 28 to mix with charge air from charge air system 4 in GFM. Thus, cylinder specific mixing zones downstream of each gaseous fuel admission valve 58 are generated. For example, gaseous fuel admission valves 58 may be solenoid actuated plate valves in which springs hold a lower surface of a movable disk against an upper surface of a stationary disk or plate, the two surfaces being configured to provide a sealed relationship in a closed state of gaseous fuel admission valve 58. Each gaseous fuel admission valve 58 may be mounted to a cylinder head covering at least one cylinder 9.

Purge gas system 7 (indicated in FIG. 1 by a dashed-dotted box) comprises a purge gas tank 60, a purge gas control valve 62, and a purge gas shut-off valve 64 connected in series. Purge gas tank 60 constitutes a purge gas source to flush gaseous fuel piping 42, gaseous fuel manifold 54, etc. with a purge gas, such as nitrogen in a pressurized state.

Purge gas system 7 may be fluidly connected to gaseous fuel system 6 at various locations. For example, in FIG. 1 a first connection 66 is disposed proximal to the gaseous fuel manifold 54. A second connection 70 is disposed proximal to gaseous fuel source 36. First shut-off valve 68 and second shut-off valve 72 can block or allow a purge gas flow through first connection 66 and second connection 70, respectively. Additional connections may be integrated in gas valve unit of gaseous fuel source 36.

As previously mentioned, FIG. 1 illustrates a DF internal combustion engine as well as a gaseous fuel engine. In a DF internal combustion engine, liquid fuel system 8 comprises a liquid fuel tank 40 connected to liquid fuel piping 43. Liquid fuel tank 40 may comprise a first liquid fuel tank for storing a first liquid fuel, for example, heavy fuel oil (HFO), and a second liquid fuel tank for storing a second liquid fuel, for example, diesel fuel. Liquid fuel tank 40 constitutes a liquid fuel source for supplying liquid fuel for combustion in LFM. Additionally, liquid fuel tank 40 may constitute a liquid fuel source for supplying ignition fuel in GFM.

Liquid fuel piping 43 is fluidly connected to a liquid fuel manifold 46, which splits into a plurality of liquid fuel inlet channels 48. To dose liquid fuel into the combustion chamber of cylinder 9, in each liquid fuel inlet channel 48 a fuel injection system 50 is installed.

In a gaseous fuel internal combustion engine, such as a spark ignited gaseous fuel internal combustion system, fuel injection system 50 is fluidly connected to gaseous fuel source 36 (indicated by a dashed line 49) instead of liquid fuel tank 40. In this embodiment fuel injection system 50 may comprise a pre-combustion chamber for providing spark ignited pilot flames 91 (see FIG. 3) to ignite the mixture of gaseous fuel and air.

Exemplary embodiments of fuel injection system 50 for DF and gaseous fuel internal combustion engines are described in more detail when referring to FIG. 2 and FIG. 3, respectively.

As shown in FIG. 1, internal combustion engine 100 may further comprise one or more knock sensors 77. Knock sensors 77 may be mounted at cylinder 9 and configured to generate a signal corresponding to a knock level of cylinder 9. Knock sensor 77 may alternatively be mounted at the cylinder head or intake manifold 26 of internal combustion engine 100. Knock sensors 77 may in addition or alternatively be configured to generate a signal corresponding to a knock level of internal combustion engine 100. A knock sensor is further described in connection with FIG. 2.

To control operation of internal combustion engine 100, a control unit 76 is provided. Control unit 76 forms part of a control system of the engine. Control unit 76 is configured to receive knock data of knock sensor 77 via a readout connection line 101. Control unit 76 may further be configured to control various components of internal combustion engine 100 such as wastegate valve 552 via a control connection line 102, blow-off valve 442 via a control connection line 103, gaseous fuel admission valves 58 via a control connection line 104, fuel injection system 50 via a control connection line 106. Control unit 76 may further be configured to control valves of purge gas system 7 via additional control lines. Alternatively, a second control unit (not shown) may be configured to control the operation of internal combustion engine 100. Further description of the control system and additional control lines between control unit 76 and other components of the engine, such as the fuel injection system 50, will be given when referring to FIGS. 2 and 3.

Control unit 76 may further be connected to other sensors not shown in FIG. 1, such as engine load sensors, engine speed sensors, temperature sensors, NOx-sensors, or fuel-to-air ratio sensors provided for each individual cylinder or for a plurality of cylinders. Control unit 76 may also be connected to an operator panel (not shown) for issuing a warning to the operator, indicating a failure of the engine or the like.

FIG. 2 shows a cylinder 9 of a DF internal combustion engine 200 which is an exemplary embodiment of internal combustion engine 100 of FIG. 1. Elements already described in connection with FIG. 1 have the same reference numerals, such as engine block 2, control unit 76, knock sensor 77, and cylinder 9.

Cylinder 9 provides at least one combustion chamber 10 for combusting a mixture of gaseous fuel and air, a piston 84, and a crankshaft 80 which is drivingly connected to piston 84 via a piston rod 82. Piston 84 is configured to reciprocate within cylinder 9.

Cylinder 9 is connected to intake manifold 26 via inlet channel 28 and to exhaust gas manifold 34 via outlet channel 35 (see FIG. 1). Inlet valve 16 is disposed in inlet channel 28, and outlet valve 18 is disposed in outlet channel 35. Gaseous fuel admission valve 58 can supply gaseous fuel to combustion chamber 10 of cylinder 9.

FIG. 2 further illustrates fuel injection system 50 by a dashed box. When DF internal combustion engine 200 is operated in LFM, fuel injection system 50 is used to inject liquid fuel into combustion chamber 10, the liquid fuel being the sole source of energy. When DF internal combustion engine 200 is operated in GFM, fuel injection system 50 may be used to inject a pilot amount of liquid fuel into combustion chamber 10 to ignite the mixture of gaseous fuel and air. In GFM, fuel injection system 50 may therefore function as a gaseous fuel ignition system.

In FIG. 2, an exemplary embodiment of such a gaseous fuel ignition system is based on a main liquid fuel injector 38 for injecting a large amount of liquid fuel in LFM and a pilot amount of liquid fuel into combustion chamber 10 to ignite the mixture of gaseous fuel and air in GFM. In other embodiments, such as for heavy duty DF internal combustion engines, gaseous fuel ignition system may comprise a separate ignition liquid fuel injector 39 to inject the pilot amount of liquid fuel into combustion chamber 10 in GFM.

As exemplarily shown in FIG. 2, cylinder 9 further comprises knock sensor 77 for detecting pressure fluctuations within combustion chamber 10. In general, knock sensor 77 may be any type of knock sensor known to the skilled person. For example, knock sensor 77 may additionally or alternatively be configured to detect fluctuations indicative of engine knock, such as sound waves propagating within intake manifold 26 and/or engine block 2, or temperature fluctuations within combustion chamber 10.

Knock sensor 77 may detect those fluctuations and generate a signal, such as a voltage signal, which corresponds to an intensity of the detected knock.

DF internal combustion engine 200 further comprises a control system including control unit 76. Control unit 76 is connected to main liquid fuel injector 38 via control connection line 108 and, in case of heavy duty DF internal combustion engines, also to ignition liquid fuel injector 39 via a separate control connection line (not shown).

FIG. 3 shows a cylinder 9 of a gaseous fuel internal combustion engine 300 being another exemplary embodiment of internal combustion engine 100 of FIG. 1. Elements already described in connection with FIGS. 1 and 2 have the same reference numerals. Gaseous fuel internal combustion engine 300 is similar to DF internal combustion engine 200 of FIG. 2, except for the components described in the following.

Fuel injection system 50 comprises a pre-combustion chamber 90. Pre-combustion chamber is configured to receive a pre-mixture of gaseous fuel and air outside of combustion chamber 10. The pre-mixture of gaseous fuel and air is ignited, for example by a spark plug, to provide pilot flames 91 disposed into combustion chamber 10. Pilot flames 91 are used to ignite the mixture of gaseous fuel and air in combustion chamber 10. Control unit 76 is connected to pre-combustion chamber 90 via control connection line 110. Alternatively, fuel injection system 50 may be a spark plug for igniting the mixture of gaseous fuel and air via an electric discharge.

In general, control unit 76 of an engine as disclosed in connection with FIG. 1 to FIG. 3 may be a single microprocessor or multiple microprocessors that include means for controlling, among others, an operation of various components of DF internal combustion engine 200. Control unit 76 may be a general engine control unit (ECU) capable of controlling numerous functions associated with DF internal combustion engine 200 and/or its associated components. Control unit 76 may include all components required to run an application such as, for example, a memory, a secondary storage device, and a processor such as a central processing unit or any other means known in the art for controlling DF internal combustion engine 200 and its components. Various other known circuits may be associated with control unit 76, including power supply circuitry, signal conditioning circuitry, communication circuitry and other appropriate circuitry. Control unit 76 may analyze and compare received and stored data and, based on instructions and data stored in memory or input by a user, determine whether action is required. For example, control unit 76 may compare received knock data from knock sensor 77 with target values stored in memory, and, based on the results of the comparison, transmit signals to one or more components of the engine to alter the operation of the same.

INDUSTRIAL APPLICABILITY

Exemplary internal combustion engines suited to the disclosed control procedure are, for example, DF internal combustion engines of the series M46DF, M34DF and M43DF or gaseous fuel internal combustion engines of the series GCM34 and GCM46 manufactured by Caterpillar Motoren GmbH & Co. KG, Kiel, Germany, or other spark ignited open or pre-combustion chamber gaseous fuel engines. Respective internal combustion engines may be operated at 500-750 rpm and may be applied, for example, in medium speed power generator sets and/or compressor or pump drives. Other engines suited to the disclosed procedure are, for example, gaseous fuel engines of the series 3600 and 3500, as well as other dynamic gas blending engines manufactured by Caterpillar Inc., which are typically operated at speeds of up to 1500 rpm or even 3000 rpm. One skilled in the art would however appreciate that the disclosed procedures may also be adapted to suit other internal combustion engines.

In the following, operation and control of an internal combustion engine such as internal combustion engines described with reference to FIG. 1 to FIG. 3 are described in connection with FIG. 4 to FIG. 7. For illustration purposes, the procedures described herein are disclosed with reference to structural elements disclosed in FIG. 1 to FIG. 3. However, the skilled person will appreciate that the respective steps of the procedure can be performed on other embodiments as well.

Figure 4:
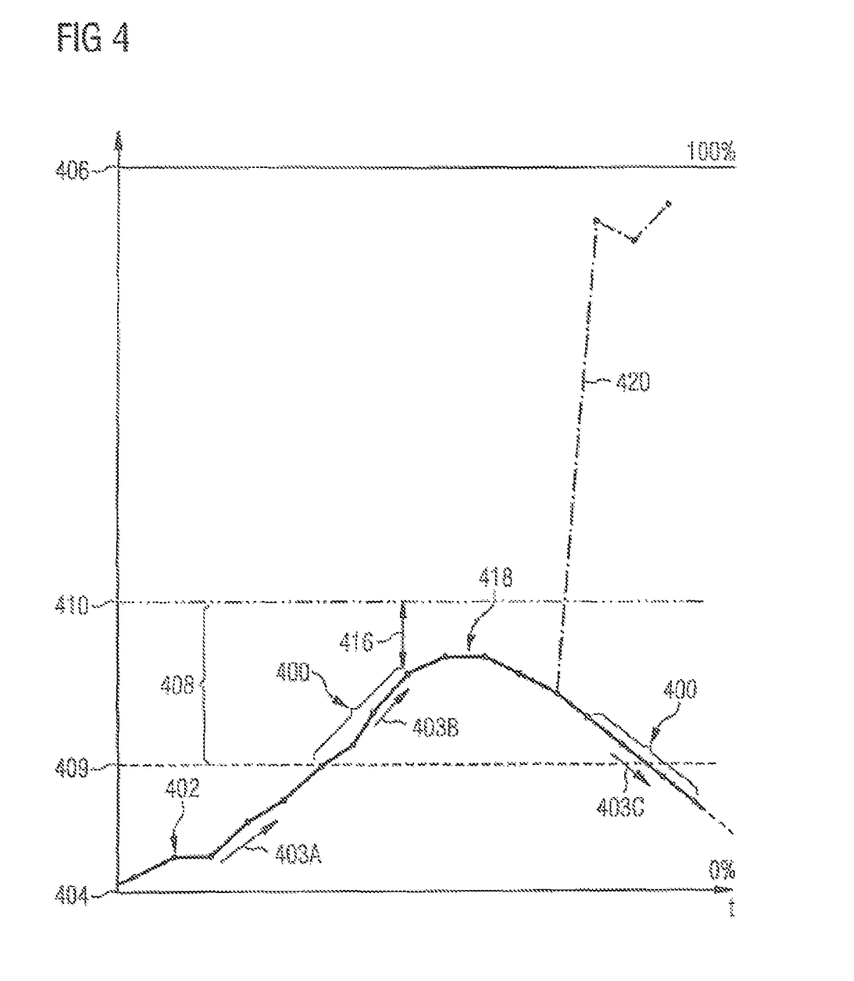
FIG. 4 shows an exemplary time-knock level diagram of an internal combustion engine operating at least partly on gaseous fuel with a varying gas composition.

Referring to FIG. 4, an exemplary time-knock level diagram of an internal combustion engine operating at least partly on gaseous fuel with a varying gas composition is shown. The time-knock level diagram shows a temporal development of knock levels 402, which are illustrated exemplarily for selected combustion cycles by dots. FIG. 4 further illustrates that the sequence of received knock levels 402 can be grouped in knock data 400 which correspond to knock levels 402 associated with a time period during which the gaseous fuel showed a varying gas composition. Depending on the configuration, type and speed of internal combustion engine 100, the time period may be, for example, in the range from several 10 seconds to 120 min.

"Knock levels" may be determined from control unit 76 by performing a frequency analysis of the voltage signal received from knock sensor 77. The skilled person will however appreciate that the frequency analysis may depend on the operating condition of internal combustion engine 100, such as on engine speed or engine load, as well as on the type or configuration of the engine to be controlled.

Based on the frequency analysis, control unit 76 determines the amplitudes of those frequencies and compares the determined amplitudes with preset lower and higher amplitude threshold companions stored on the memory of control unit 76.

Control unit 76 then associates amplitudes equal to or smaller than the preset lower amplitude threshold companion with 0% knock levels (base line 404). Similarly, control unit 76 associates amplitudes equal to or larger than the preset higher amplitude threshold companion with 100% knock levels (top line 406). Consequently, a knock level of 0% (base line 404) indicates that no knocking occurs in internal combustion engine 100 or at least that the knock level present in the internal combustion engine is below the knock levels detectable by control unit 76. A knock level of 100% (top line 406) indicates that internal combustion engine experiences severe knocking. Knock levels between 0% and 100% correspond to a knock intensity between no knocking and severe knocking, i.e. amplitudes between the lower and higher amplitude threshold companions (e.g. presented in logarithmic or linear units) are projected on the 100% range.

As can be further seen in FIG. 4, the exemplary knock data 400 show knock levels 402 with a tendency to change over the time period during which the gaseous fuel varied in gas composition. For example, knock levels 402 may have a tendency to increase (indicated by the upward arrows 403A and 403B) or may have a tendency to decrease (indicated by the downward arrow 403C). For example, for a medium speed engine (operating at approximately 500 rpm) the tendency may be based on a sequence of 4, 10, 20, 200, or up to 2000 combustion cycles or more, such as on a sequence of at least 4, at least 10, at least 20, at least 200, or at least 2000 combustion cycles. Control unit 76 associates tendencies 403A, 403B, 403C with a variation in the gas composition and adjusts the operation condition of internal combustion engine 100 such that a knock susceptibility of the engine is adapted to the varying gas composition.

Figure 5:
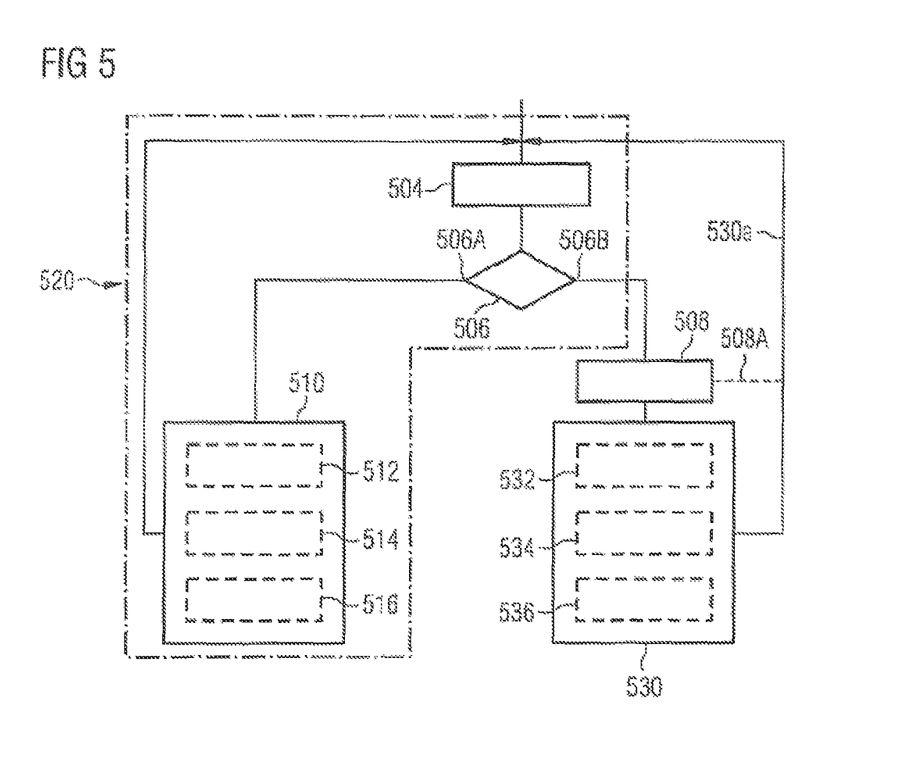
FIG. 5 shows a generic flow diagram of an exemplary procedure for controlling an internal combustion engine in response to the varying gas composition of the gaseous fuel.

Referring to FIG. 5, controlling the internal combustion engine is explained in connection with FIG. 4. At step 504, a knock data such as the one shown in FIG. 4 is received from knock sensor 77 by control unit 76 via readout connection line 101.

At step 506, control unit 76 determines from knock data 400 whether knock levels 402 have a tendency to change over the time period, and accordingly whether a variation in the gas composition of the gaseous fuel supplied to internal combustion engine 100 has occurred. When determining the tendency, control unit 76 may further determine whether knock levels 402 have a tendency to increase (403A, 403B) or a tendency to decrease (403C).

Control unit 76 may further determine, in particular for a tendency to increase (403A, 403B) that knock data 400 fulfill the requirement that knock levels 402 are outside or within a preset knock level range 408 below a preset knock level threshold 410. For example, tendency 403A may not result in a control action, whereas tendency 403B may result in control actions. A lower limit 409 of preset knock level range 408 and preset knock level threshold 410 are exemplarily shown in FIG. 4 as dashed and double-dashed lines, respectively. Preset knock level range 408 enables control unit 76 to classify whether the determined tendency to increase (403A, 403B) requires appropriate control actions for internal combustion engine 100 in response to a, for example, potentially harmful change in LHV or Methane Number. Such a determination may not be applied for a tendency to decrease (403C), as indicated by the respective knock data 400 crossing line 409.

Alternatively or in addition, control unit 76 may determine a knock margin 416, where knock margin 416 is a difference between knock level threshold 410 and the current knock level 402. Control unit 76 may further determine whether knock margin 416 is within a preset knock margin range from knock level threshold 410 to classify whether the determined tendency to increase (403A, 403B) may require appropriate control actions.

Preset knock level range 408, preset knock level threshold 410 and preset knock margin range may be empirical values stored on the memory of control unit 76. Preset knock level range 408, preset knock level threshold 410 and preset knock margin range may also be set in dependence of the operating condition of internal combustion engine 100, for example, in dependence of a load or a speed of the engine. In this case, control unit 76 may additionally be connected to a load sensor or a speed sensor of internal combustion engine 100. Preferably, preset knock level threshold 410 may be in the range from 1% to 10%. Likewise, preset knock level range 408 may extend down to 0%, for example, the lower limit 409 is in the range from 0% to 5%, accordingly the preset knock margin range may be in the range from 0% to 10%.

Once control unit 76 determined at point 506A that knock levels 402 have a tendency to change, control unit 76 adjusts at step 510 an operating condition of internal combustion engine 100 such that the knock susceptibility of internal combustion engine is adapted to the varying gas composition. When control unit 76 determined that knock levels 402 have a tendency to increase (403A, 403B) and, for example, additionally determined that this tendency occurred within preset knock level range 408, the control actions performed at step 510 may include any known control action appropriate to reduce the knock susceptibility of internal combustion engine 100. Control actions may be, for example, increasing (step 512) an IMAP of intake air admitted to cylinder 9, delaying (step 514) an ignition timing of cylinder 9 by an ignition delay time, and/or substituting (step 516) a portion of gaseous fuel with liquid fuel such as diesel fuel.

In some embodiments, control unit 76 may additionally be configured to reduce a temperature of intake air or a mixture of gaseous fuel and air supplied to internal combustion engine 100. For example, control unit 76 may additionally be connected to charge air cooler 24 (FIG. 1) and operate charge air cooler 24 to effect cooling of the intake air or the mixture supplied to internal combustion engine 100. In some embodiments, variable camshaft timing may be applied to adapt the combustion cycle to a Miller cycle, thereby decreasing a temperature of the charge air. In some embodiments, control unit 76 may additionally be configured to reduce the load of internal combustion engine 100. Control unit 76 may therefore be connected to a load sensor of internal combustion engine 100.

Similarly, when control unit 76 determined at point 506A that knock levels 402 have a tendency to decrease (403C), the control actions performed by control unit 76 at step 510 may include any known control action appropriate to increase the knock susceptibility, thereby adapting the operating condition of internal combustion engine 100 to the decreasing LHV and/or increasing Methane Number. Control actions may include, for example, decreasing (step 512) an IMAP of intake air admitted to cylinder 9, advancing (step 514) an ignition timing of cylinder 9 by an ignition advance time, and/or substituting (step 516) a portion of liquid fuel with gaseous fuel.

Further control actions in addition or alternative to the above mentioned control actions may be performed to adapt the knock susceptibility of internal combustion engine 100.

In some embodiments, when internal combustion engine 100 is equipped with a NOx-sensor, control unit 76 may additionally or alternatively adjust at step 510 control actions in dependence of NOx emissions received from the NOx-sensor to comply, for example, with emission regulations.

The control actions may be performed for each cylinder 9 or for all cylinders 9 and may be performed together or individually. The person skilled in the art will however appreciate that substituting (step 516) a portion of gaseous fuel with liquid fuel, or alternatively a portion of liquid fuel with gaseous fuel, may not be performed in gaseous fuel internal combustion engines.

The control steps 504, 506 and 510 may further be performed in a closed loop based control 520 (indicated by the dashed-dotted box in FIG. 5). The closed loop based control 520 includes at least one control action set out in step 510 and is performed until the received knock data 400 correspond to stable knock levels (region 418 in FIG. 4). Stable knock levels indicate that the knock susceptibility of internal combustion engine 100 is adapted to the current LHV and/or Methane Number of the gaseous fuel. Once control unit 76 determines that the knock levels no longer have a tendency to change (point 506B), e.g. by showing stable knock levels (in region 418 of FIG. 4), control unit 76 determines at step 508 that no further control action is required. The procedure then returns to initial step 504 via loop 508A.

Alternatively, once the control actions have been performed and a further change in operating condition of internal combustion engine 100 is required, for example, a change in engine load or engine revolution, the procedure set out above may be reset and initiated anew, thereby returning to initial step 504 without any further steps being performed. Resetting the procedure may include resetting preset knock level range 408, preset knock level threshold 410 and/or preset knock margin range, as well as the control actions performed so far. A continuous control without resetting may also be applied.

In some embodiments, the procedure may additionally include an inversion section 530. In inversion section 530, control unit 76 inverts the control actions performed at step 510 in response to the determined stable knock levels received by control unit 76 during a previous run through closed loop based control 520. Inversion section 530 may include inversion actions, such as decreasing (step 532) an IMAP of intake air admitted to cylinder 9, advancing (step 534) an ignition timing of cylinder 9, and/or substituting (step 536) a portion of liquid fuel with gaseous fuel, in case control actions were performed in response to increasing knock levels.

Alternatively, inversion actions may include, for example, increasing (step 532) an IMAP of intake air admitted to cylinder 9, delaying (step 534) an ignition timing of cylinder 9, and/or substituting (step 536) a portion of gaseous fuel with liquid fuel, in case control actions were performed in response to decreasing knock levels.

It should be appreciated that, similarly to the control actions set out in step 510, inversion actions may be performed together or individually, for each cylinder 9 or for all cylinders of internal combustion engine 100.

It will be appreciated that for a given control action, the procedure does not require the corresponding inversion action to be performed in response to the stable knock levels. In other words, the disclosed procedure may not be limited to, for example, advancing (step 534) an ignition timing, when the operating condition was changed by delaying (step 514) an ignition timing, and vice versa. Once inversion actions have been performed, the procedure returns to initial step 504 via loop 530A.

In some embodiments, where internal combustion engine 100 comprises a plurality of knock sensors 77 mounted at each individual cylinder 9, control unit 76 may receive separate sets of cylinder specific knock data corresponding to the respective cylinder 9 and may start the procedure set out above once for at least one of the cylinder specific knock data the respective knock levels 402 have a tendency to increase (403A, 403B) or decrease (403C). The herein described procedure will be more stable, if a cylinder balancing is applied to internal combustion engine 100. In that case, internal combustion engine 100 will run balanced and respective knock levels 402 should be equal for all cylinders 9.

Figure 6:
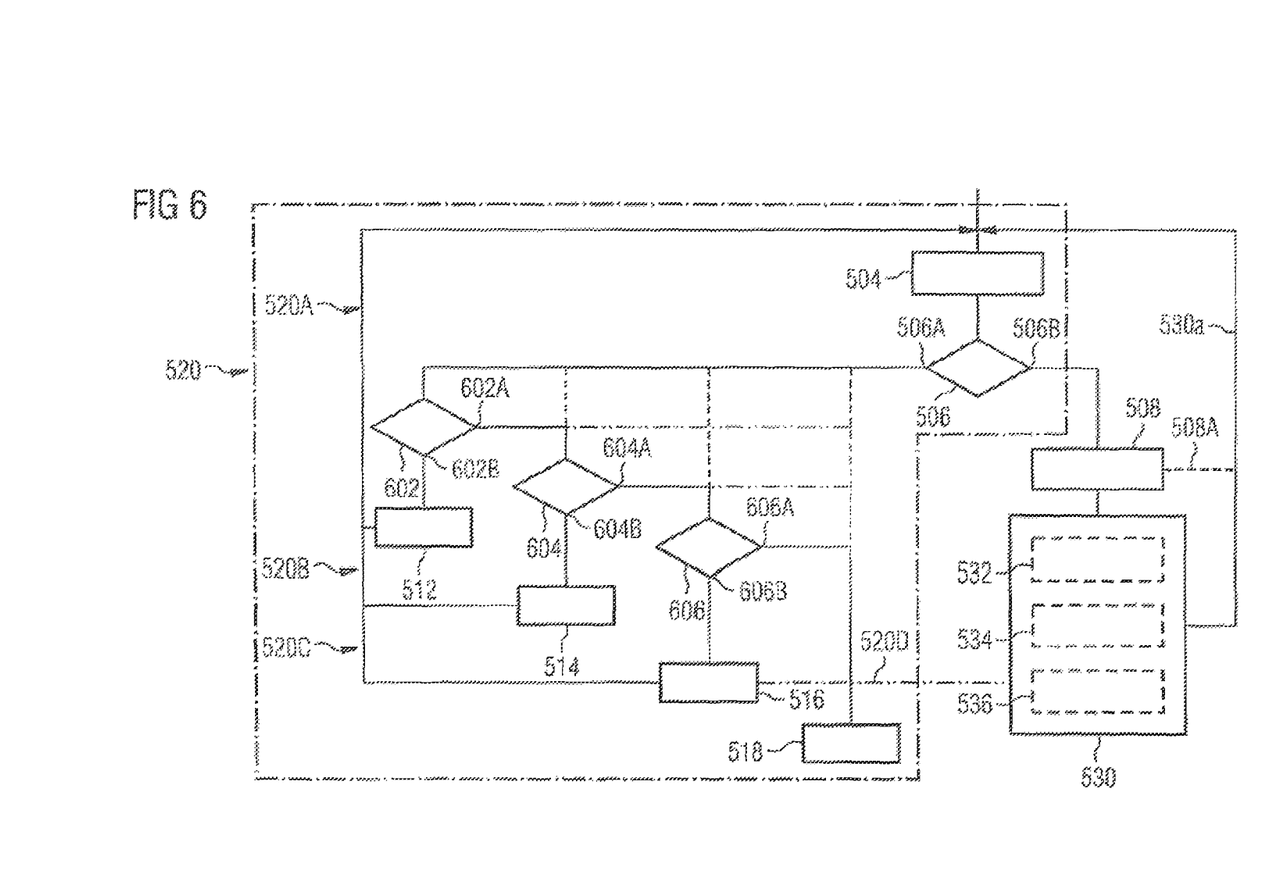
FIG. 6 shows a flow diagram of an exemplary procedure for controlling an internal combustion engine in response to the varying gas composition with a sequence of closed loop based controls.

In FIG. 6, a flow diagram for controlling an internal combustion engine is shown where a respective control action is associated with a preset maximal change in operating condition. In the exemplary procedure, control unit 76 determines at point 506A that knock levels 402 have a tendency to increase (403A, 403B in FIG. 4) over the time period. The skilled person will however appreciate that the procedure may be performed vice versa in case control unit 76 determined that knock levels 402 have a tendency to decrease (403C in FIG. 4). Steps already described in connection with FIG. 5 have the same reference numerals.

In FIG. 6, the closed loop based control 520 of FIG. 5 is implemented as three closed loop based controls (520A, 520B, 520C). Each closed loop based control is associated with a respective control action and is performed until the respective control action reaches a preset maximal change in operating condition. Once the preset maximal change in operating condition is reached for a specific control action, another closed loop based control is initiated. Alternatively, internal combustion engine 100 may be switched to liquid fuel mode (step 518) without initiating another closed loop based control, thereby reducing the knock susceptibility of internal combustion engine 100 without performing further control actions set out above.

In the exemplary embodiment of FIG. 6, closed loop based control 520 comprises a first closed loop based control 520A which is associated with a first control action, for example, increasing an IMAP of intake air. Once control unit 76 determined at point 506A that the knock levels have a tendency to increase (403A, 403B in FIG. 4), control unit 76 checks at step 602 whether an opening area of blow-off valve 442 and/or wastegate valve 552 has already reached a preset minimal opening area. The preset minimal opening area may be, for example, in the range from 0% to 5%. In case the opening area of blow-off valve 442 and/or wastegate valve 552 has not reached the preset minimal value (point 602B), control unit 76 further increases at step 512 the IMAP of intake air. The loop is repeated until at point 602A control unit 76 determines that the preset minimal opening area is reached and that the IMAP can no longer be increased.

Control unit 76 then initiates a second closed loop based control 520B which is associated with a second control action, for example, delaying (step 514) an ignition timing of cylinder 9. Control unit 76 checks at step 604 whether the ignition delay time has reached a preset maximal ignition delay time, and performs second closed loop based control 520B until the maximal ignition delay time is reached (point 604B). The maximal ignition delay time may be set in dependence of a load and/or a speed of internal combustion engine 100 and may be, for example in the range from 1 degree crank angle to 10 degrees crank angle.

When the first and second closed loop based controls 520A, 520B can no longer be performed because both control actions have reached their respective preset maximal change of operating condition, control unit 76 initiates a third closed loop based control 520C with a third control action, for example, substituting (step 516) a portion of gaseous fuel with liquid fuel. Similarly, the third closed loop based control 520C is performed until control unit 76 determines at point 606A that a preset maximal portion of gaseous fuel, for example up to 50%, is substituted. In other embodiments, the preset maximal portion of gaseous fuel may be 60%, 70%, or up to 100%. At that point, control unit 76 finally initiates a switch from GFM to LFM (step 518). In some embodiments, upon performing the third closed loop based control (520C), i.e. substituting gaseous fuel with liquid fuel such as diesel fuel, control unit 76 may also advance ignition timing of cylinder 9 (and increase the portion of liquid fuel at the same time) or perform other inversion actions of inversion section 530 as indicated by the double-dashed line 520D.

Alternatively, once control unit 76 has determined for any closed loop based control that the respective control action has reached its preset maximal change in operating condition, control unit 76 may directly proceed to the closed loop based controls that may still be performable, as indicated by the dashed lines. In some embodiments or under specific conditions, such as a very large tendency, control unit 76 may initiate the switch from GFM to LFM (step 518) already, when just one of the closed loop based controls (520A, 520B, 520C) can no longer be performed, as indicated by the double-dashed lines. This may be the case, for example, when internal combustion engine 100 needs to react quickly to the varying gas composition.

Figure 7:
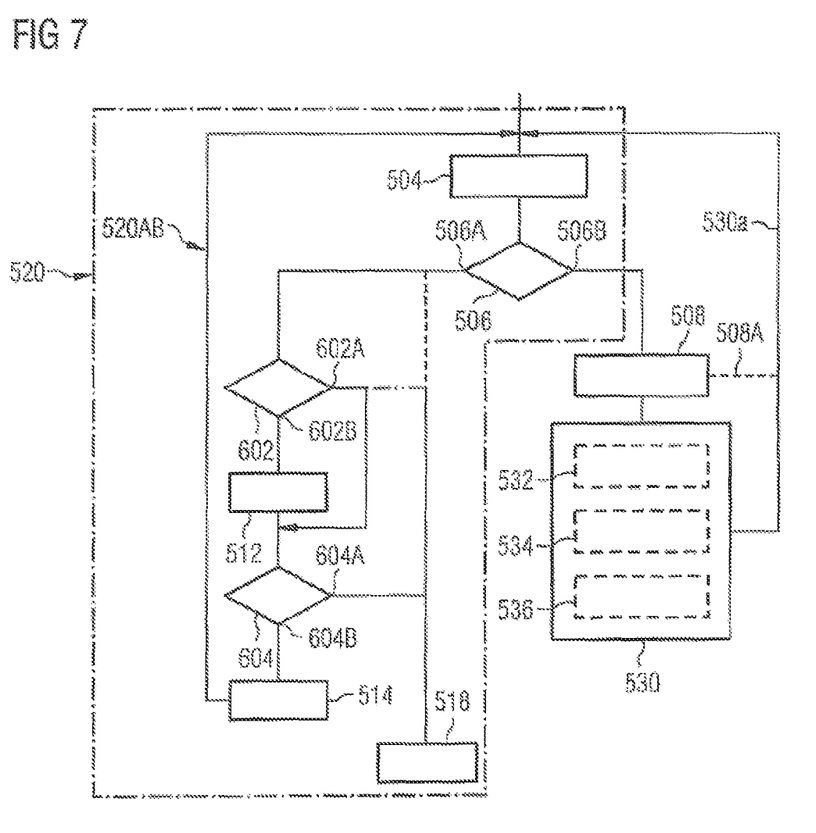
FIG. 7 shows a flow diagram of an exemplary procedure for controlling an internal combustion engine in response to the varying gas composition with a closed loop based control with two control actions being performed together.

FIG. 7 shows yet another control procedure that includes a closed loop based control 520AB with two control actions being performed together in the loop. Such an embodiment may be used, for example, when control unit 76 determined that tendency 403A, 403B, 403C of knock levels 402 is beyond a preset tendency, thereby determining that a large change in LHV and/or Methane Number has occurred. The preset tendency may be stored on the memory of control unit 76, or alternatively it may be set according to empirical values.

In the exemplary procedure, control unit 76 determines at point 506A that knock levels 402 have a tendency to increase, thereby determining that a large rise in LHV and/or a large decrease in Methane Number has occurred. Once the large change in LHV and/or Methane Number is determined, control unit 76 performs, for example, the control steps of increasing (step 512) an IMAP and delaying (step 514) an ignition timing for one or all cylinders within one closed loop based control. In case control unit 76 determined at point 602A that the IMAP has already reached the preset maximal IMAP value, the procedure may directly proceed to step 604 to check whether delaying an ignition timing has also already reached the preset maximal ignition delay time. If this is the case, at point 604A, control unit 76 initiates the switch from GFM to LFM (step 518).

Alternatively, when control unit 76 determines at point 506A that knock levels 402 have a tendency to decrease, control unit 76 may perform, for example, the control steps of decreasing (step 512) an IMAP and advancing (step 514) an ignition timing together in one loop.

In some embodiments, the disclosed procedure may be performed in parallel with other known procedures for detecting and/or controlling knock in internal combustion engine 100, where the detected knock may be caused by other phenomena than the described varying gas composition. For example, an ignition timing of cylinder 9 may be delayed, an IMAP of the intake air may be increased, and/or a portion of gaseous fuel may be substituted with liquid fuel, such as diesel fuel, when knock levels 402 exceed preset knock level threshold 410 (indicated by the dashed-dotted line 420 in FIG. 4). In this case, known knock control strategies will be performed, but the herein described procedure for controlling internal combustion engine 100 in response to the varying gas composition may stay active too.

In some embodiments, the received knock data 400 or sub-sets of the same may be subjected to data filtering steps and/or data smoothing steps prior to initial step 504 in order to improve the signal-to-noise ratio of knock data 400, thereby increasing the robustness of the described procedure as well.

Multiple closed loop based controls (520A, 520B and 520C) may be based on a variety of operating parameters which may be changed, once a change in gas quality has been determined.

Inversion section 530 may ensure that for a given operating condition of internal combustion engine 100, the control measures associated with closed loop based control 520 do not reach the respective preset maximal change in operating condition. Thus, internal combustion engine 100 can react to a further change in gas quality.

The herein described procedures are, for example, suitable for internal combustion engines operated in industrial power plants, such as generator sets on oil/gas platforms, where varying gas qualities may negatively affect the power output of the power plant. Using the herein disclosed aspects, internal combustion engines may run at operating conditions adapted to the current gas quality and, as a result, knock susceptibility of the internal combustion engines may be reduced and up time of the engines may be increased.

While herein some examples may only be given for increasing or decreasing knock levels (as an example of a change of gas composition), the skilled person will appreciate, that a respective situation may also be addressed for decreasing or increasing knock levels.

Although the preferred embodiments of this invention have been described herein, improvements and modifications may be incorporated without departing from the scope of the following claims.

The invention claimed is:

1. A method for controlling an internal combustion engine operating at least partly on gaseous fuel with a varying gas composition, the method comprising:
   receiving knock data corresponding to knock levels over a time period;
   identifying an increasing trend in the knock data, the increasing trend being an increase in the knock levels over the time period;
   determining whether the knock levels are within a preset knock level range, the preset knock level range extending from a lower limit to a preset knock level threshold, the lower limit being greater than a knock level of zero, the preset knock level threshold being greater than the lower limit; and
   when the increasing trend in the knock data is within the preset knock level range, adjusting an operating condition of the internal combustion engine to reduce a knock susceptibility of the internal combustion engine in response to the increasing trend in the knock data.

2. The method of claim 1, wherein the time period includes at least 4 combustion cycles of the internal combustion engine, and
   wherein the knock data includes a knock level value corresponding to each combustion cycle of the at least 4 combustion cycles of the internal combustion engine.

3. The method of claim 1, further comprising:
   setting the preset knock level threshold, the lower limit, and a preset knock margin range based on a current operating condition of the internal combustion engine; and
   defining a severe knocking limit that is greater than the preset knock level threshold, wherein
   the preset knock level threshold is set in a range from 1% to 10% of the severe knocking limit, and
   the preset knock margin range is set in a range from 0% to 5% of the severe knocking limit.

4. The method of claim 1, further comprising:
   performing repeatedly a closed loop based control until the received knock data correspond to stable knock levels.

5. The method of claim 1, further comprising:
   determining that a change in the knock levels exceeds a preset amount of change; and
   performing a closed loop based control comprising at least two control actions being performed together in the loop.

6. The method of claim 1, wherein for individual cylinders of the internal combustion engine, separate sets of cylinder specific knock data are received and the method is performed when at least for one of the cylinder specific knock data the respective knock levels increase over the time period.

7. The method of claim 1, wherein the controlling the operating condition of the internal combustion engine includes at least one of controlling a speed of the internal combustion engine and controlling a power output of the internal combustion engine.

8. The method of claim 1, further comprising:
determining a knock margin as a difference between the preset knock level threshold and a knock value based on the knock data; and
comparing the knock margin to a preset knock margin range.

9. The method of claim 1, wherein when the increasing trend in the knock data is within the preset knock level range, the adjusting the operating condition of the internal combustion engine includes increasing an intake manifold air pressure (IMAP) of intake air admitted to a cylinder of the internal combustion engine.

10. The method of claim 1, wherein when the increasing trend in the knock data is within the preset knock level range, the adjusting the operating condition of the internal combustion engine comprises at least one of the following control actions:
increasing an intake manifold air pressure (IMAP) of intake air admitted to a cylinder of the internal combustion engine;
delaying an ignition timing of the cylinder by an ignition delay time; and
substituting a portion of gaseous fuel with liquid fuel.

11. The method of claim 10, wherein when the received knock data correspond to stable knock levels, the method further comprises:
inverting at least one of the control actions.

12. The method of claim 1, further comprising:
identifying a decreasing trend in the knock data, the decreasing trend being a decrease in the knock levels over the time period; and
when the decreasing trend in the knock data is within the preset knock level range, adjusting the operating condition of the internal combustion engine by performing at least one of:
decreasing an intake manifold air pressure (IMAP) of intake air admitted to a cylinder of the internal combustion engine;
advancing an ignition timing of the cylinder by an ignition advance time; and
substituting a portion of liquid fuel with gaseous fuel.

13. The method of claim 10 or claim 12, wherein the adjusting the operating condition of the internal combustion engine includes:
performing a first closed loop based control for a first control action;
detecting during the first closed loop based control that a preset maximal change for the first control action is reached; and
performing a second closed loop based control for a second control action.

14. The method of claim 13, wherein when the knock levels increase over the time period,
the first closed loop based control is performed by increasing the IMAP of intake air until at least one of an opening area of a blow-off valve and a wastegate valve has reached a preset minimal opening area of 0% to 5%,
the second closed loop based control is performed by delaying an ignition timing of the cylinder until the ignition delay time reaches a preset maximal ignition delay time in a range from 1 degree crank angle to 10 degrees crank angle, and
a third closed loop based control is performed by substituting a portion of gaseous fuel with liquid fuel until a preset maximal portion of gaseous fuel up to 50% is substituted with liquid fuel, the preset maximal ignition delay time is reached, or when a decreasing trend in the knock data is identified within the preset knock level range.

15. A control system for an internal combustion engine operating at least partly on gaseous fuel with a varying gas composition, the control system comprising:
a knock sensor configured to continuously detect knock levels of the internal combustion engine; and
a control unit connected to the knock sensor and being configured to:
receive knock data corresponding to knock levels over a time period;
identify an increasing trend in the knock data, the increasing trend being an increase in the knock levels over the time period;
adjust an operating condition of the internal combustion engine to reduce a knock susceptibility of the internal combustion engine in response to the increasing trend in the knock data, wherein the adjusting the operating condition of the internal combustion engine comprises at least one of the following control actions:
increasing an intake manifold air pressure (IMAP) of intake air admitted to a cylinder of the internal combustion engine;
delaying an ignition timing of the cylinder by an ignition delay time; and
substituting a portion of gaseous fuel with liquid fuel;
wherein the adjusting the operating condition of the internal combustion engine further comprises:
performing a first closed loop based control for a first control action;
detecting during the first closed loop based control that a preset maximal change for the first control action is reached; and
performing a second closed loop based control for a second control action.

16. The control system of claim 15, wherein the knock sensor is mounted at least partially within a cylinder of the internal combustion engine, and
wherein the control unit is connected to at least one of a blow-off valve and a wastegate valve of the internal combustion engine.

17. An internal combustion engine comprising:
a cylinder configured to combust liquid fuel and gaseous fuel;
a gaseous fuel system configured to deliver the gaseous fuel to the cylinder;
a liquid fuel system configured to deliver the liquid fuel to the cylinder;
a knock sensor configured to monitor knock levels in the cylinder; and
a control unit connected to the knock sensor, the gaseous fuel system, and the liquid fuel system the control unit being configured to:
receive knock data corresponding to the knock levels over a time period;
identify a decreasing trend in the knock data, the decreasing trend being a decrease in the knock levels over the time period;
determine whether the knock levels are within a preset knock level range, the preset knock level range extending from a lower limit to a preset knock level threshold, the lower limit being greater than a knock level of zero, the preset knock level threshold being greater than the lower limit; and when the decreasing trend in the knock data is within the preset knock level range, adjust an operating condition of the engine to increase a knock susceptibility of the engine in response to the decreasing trend in the knock data.

18. The engine of claim 17, wherein the control unit is further configured to:
identify an increasing trend in the knock data, the increasing trend being an increase in the knock levels over the time period; and
when the increasing trend in the knock data is within the preset knock level range, adjust the operating condition of the engine to reduce a knock susceptibility of the engine in response to the decreasing trend in the knock data.

19. The engine of claim 17, wherein adjusting an operating condition includes at least one of decreasing an intake manifold air pressure of intake air admitted to the cylinder, changing an ignition timing of the cylinder, changing an ignition delay time, or substituting a portion of the liquid fuel with the gaseous fuel.

20. The engine of claim 19, further comprising:
a turbocharger including a compressor and a turbine;
a blow-off valve configured to allow a portion of charged air from an outlet of the compressor to return to an air intake of the compressor; and
a wastegate valve configured to allow a portion of exhaust gas from the cylinder to bypass the turbine,
wherein the control unit is configured to adjust the operating condition by controlling opening areas of the blow-off valve and the wastegate valve.

* * * * *